May 13, 1969     P. SALERI ET AL     3,443,816

SEAL ASSEMBLY FOR A BALL-TYPE VALVE

Filed May 10, 1966

United States Patent Office 3,443,816
Patented May 13, 1969

3,443,816
SEAL ASSEMBLY FOR A BALL-TYPE VALVE
Pierino Saleri and Arturo Saleri, both of 3 Via Industriale, Lumezzane, San Sebastiano, Brescia, Italy
Filed May 10, 1966, Ser. No. 548,913
Claims priority, application Italy, Jan. 29, 1966, 2,164/66
Int. Cl. F16k 41/04; F16j 15/18, 15/34
U.S. Cl. 277—112                                   1 Claim

ABSTRACT OF THE DISCLOSURE

The seal assembly of this ball-type valve permits a fluid-tight seal under any variations in temperature by utilizing a stem which has a collar with two inclined planes, a pair of gaskets of flexible material and enclosed between bendable metallic washers of frusto-conical sectional configuration.

---

The present invention is related to improvements in ball-type valves which are employed with flow of fluids that are subject to temperature variations.

The main disadvantage encountered with ball-type valves employed in piping of fluids which are subject to variations in temperature lies in the loss of fluid occurring through the gaskets and the packing. The loss of fluid usually is due to the shrinking and deformation of the gasket material, because of thermal expansions and contractions.

It is, therefore, the aim of the instant invention to overcome this disadvantage and to provide for a valve which maintains a fluid-tight seal even when subjected to substantial variations in temperature.

The valve of this invention has a stem for the ball which controls the flow of the fluid in the pipe which is characterized by a collar with two inclined planes (an upper one and a lower one), by two gaskets of suitable plastic-elastic material, and by flexible metallic washers adapted to bend temporarily. These washers have a frusto-conical section and act upon the two plain surfaces of the gaskets and, partially, also upon the inclined surfaces of the collar. Consequently, these washers, by bending flexibly, deform the seal gaskets when the valve operates at elevated temperatures and, equally, when it is subjected to considerably lower temperatures. In either situation, the flexible metal washers assure the satisfactory adherance of the gaskets to the inner surface of the valve sleeve, within which is guided the stem of the device.

A clearer and more detailed description of the embodiments of the invention will be given hereinbelow, especially with reference to the accompanying drawings, in which.

Figure 1:
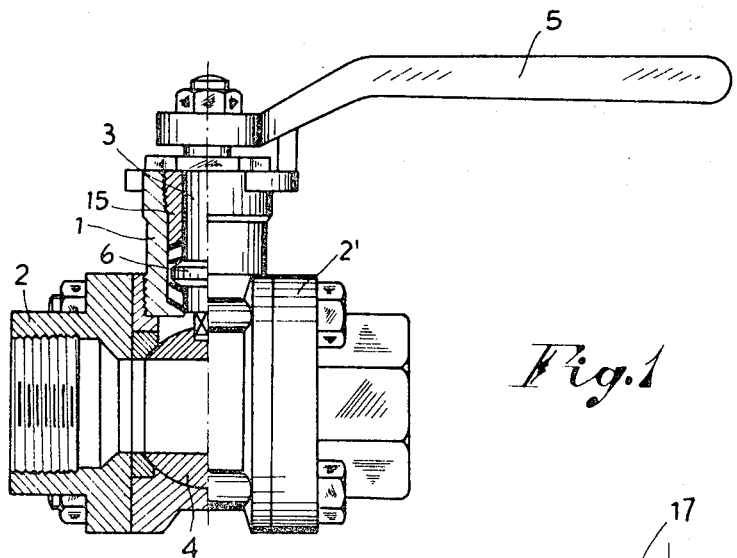
FIGURE 1 shows the assembled valve of the invention, partly in cross section and partly in perspective.
Figure 2:
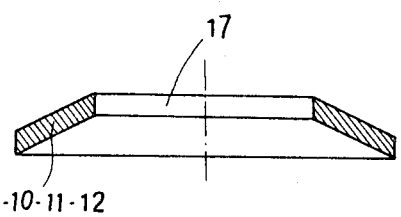
FIGURE 2 is a sectional, enlarged view of a metallic washer of the valve of FIGURE 1.
Figure 3:
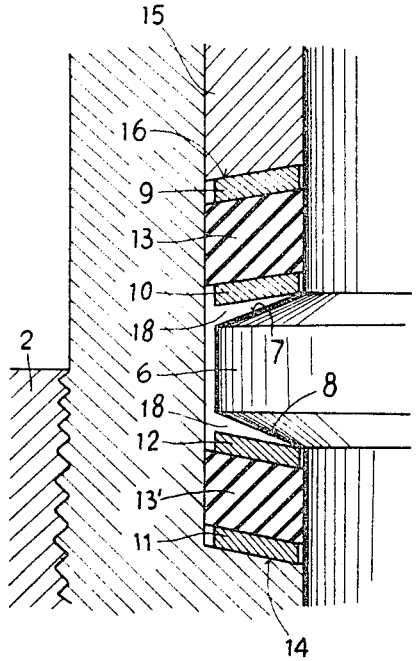
FIGURE 3 shows one of the sealing gaskets of the valve, in section and enlarged.

Referring now to the drawings, the valve comprises a sleeve 1 provided between the conventional elements forming the flanged body 2–2' of the pipe. Within the sleeve 1 there is the stem 3, the lower part of which is provided with the ball or sphere 4 for the passage of the fluid, and the upper part of which is provided with the control handle 5.

In the section intermediate the extremities of the stem 3, there is positioned a collar 6 of diameter smaller than the inner diameter of the sleeve 1. The collar 6 has two inclined surfaces 7 and 8, namely, an upper one and a lower one.

At least one, and preferably two, pairs of elastic washers 9–10 and 11–12, shaped so as to resemble a truncated cone with central opening 17, and having an outer diameter smaller than the inner diameter of the sleeve 1, are provided. Adjoining the washers there are two sealing gaskets 13–13' made of plastic-elastic material or any other suitable material.

In the lower part of the sleeve 1 there is provided an inclined surface 14. However, if this surface in the lower part of the sleeve is not inclined, the same result is obtained by utilizing a washer which, instead of having the two planar surfaces parallel to each other, has one surface inclined (not shown).

The two pairs of washers 9–10 and 11–12, mentioned hereabove, are positioned one above and one below the collar 6 of the stem 3, and between each pair there is seated the gasket 13–13'.

To secure in place the stem 3, the washers and the gaskets, all mounted on the stem, there is provided a threaded bushing 15, which is threaded on the sleeve 1 and has, in its lower portion, an inclined surface 16. The angle of inclination of the surface 16 is in the same direction to, but different than the angle of inclination of surface 7 of collar 6. Similarly, the angle of inclination of the surface 14 of the sleeve 1 is in the same direction to; but different than the angle of inclination of surface 8 of collar 6.

Figure 4:
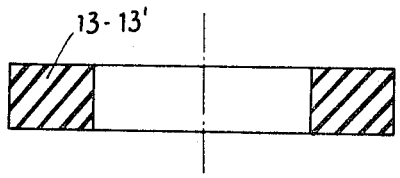
FIGURE 4 shows in partial cross section the assembly of the gaskets and the washers of the valve of FIGURE 1.

After being mounted, the washers 9–10 and 11–12 and the sealing gaskets 13–13' are in the position shown illustratively in FIGURE 4 of the drawings, namely, their inclination with respect to the longitudinal axis of the stem 3 is the same as the inclination of the surfaces 14 and 16 of the sleeve 1 and of the bushing 15, respectively. In this position, the washers 10 and 12 do not adhere fully to the surfaces 7 and 8 of the collar 6, but only partially, so as to allow a play in the area indicated with 18 between the inclined surfaces relative thereto.

When the valve is operative and the fluid is at elevated temperature, thus causing expansion and deformation of the pressured sealing elements, the washers 10 and 12, because of the thermal expansion, move flexibly and angularly about their connection with collar 6, at those points where the inclined surfaces 7 and 8 begin. As a result, the washers 10 moving upwardly (and the washer 12 moving downwardly) force the sealing gaskets 13–13' to adhere to the inner surface of the sleeve 1 and to the outer surface of the stem 3, respectively, thus achieving a perfect seal. Expansion in the other directions, that is, radially and longitudinally, is prevented by the stem 3 and by the washers 9 and 11 resting respectively on the inclined surfaces 14 and 16 of the sleeve 1 and bushing 15.

When the valve, conversely, is operative at low temperatures, thus causing a contraction of the sealing elements, the washers 10 and 12 move angularly and flexibly in the opposite direction. The fulcrum is always located at the points where the inclined surfaces 7 and 8 contact the collar 6.

The action of the metallic washers of the valve upon the sealing gaskets is, consequently, substantially constant; thus the washers are always in complete adherance with the gaskets and the surfaces of the sleeve and of the stem.

What is claimed is:

1. In a ball-type valve for fluids, a seal assembly comprising a sleeve; a stem located in said sleeve, said stem having a ring with upper and lower frusto-conical faces and with an outer diameter slightly less than the inner diameter of said sleeve; two pairs of resilient metal washers mounted on said stem in an upper and a lower position with respect to said ring, each said washer having a frusto-conical form and a diameter slightly less than the inner diameter of said sleeve, one washer in each of said two pairs resting on an inner circumferential line of the inclined faces of said ring, at least the outer periphery of each of said one washer in each of said two pairs being separated from the outer edges of its associated ring surface to provide a space for permitting flattening displacements of the washer; and a resilient seal disposed on said stem of the valve between each pair of resilient washers and in contact therewith, said seals being also in contact with the inner surface of said sleeve and the outer surface of said stem, said sleeve having inclined end surfaces associated with said washers, the angle of inclination of said end surfaces being different from the angle of inclination of the inclined surfaces of the stem ring.

References Cited

UNITED STATES PATENTS

| | | | |
|---|---|---|---|
| 1,869,915 | 8/1932 | Sample | 277—112 |
| 2,851,291 | 9/1958 | Payne | 277—102 X |
| 2,942,840 | 6/1960 | Clade | 251—315 X |
| 2,983,477 | 5/1961 | Merrill | 251—214 X |
| 3,091,471 | 5/1963 | Lawless et al. | 277—112 |
| 3,108,779 | 10/1963 | Anderson | 251—315 X |
| 3,179,426 | 4/1965 | Duer | 277—112 |

FOREIGN PATENTS 803,585 10/1958 Great Britain.

LAVERNE D. GEIGER, *Primary Examiner.*

J. S. MEDNICK, *Assistant Examiner.*

U.S. Cl. X.R.

251—214; 277—115, 125, 176, 177, 188